United States Patent
Kwon et al.

(10) Patent No.: US 8,599,762 B2
(45) Date of Patent: Dec. 3, 2013

(54) METHOD FOR RECEIVING A SIGNAL AT A USER EQUIPMENT (UE) IN A WIRELESS COMMUNICATION SYSTEM

(75) Inventors: Yeong Hyeon Kwon, Anyang-si (KR); Ja Ho Koo, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 13/143,845

(22) PCT Filed: Mar. 18, 2010

(86) PCT No.: PCT/KR2010/001682
§ 371 (c)(1),
(2), (4) Date: Jul. 8, 2011

(87) PCT Pub. No.: WO2010/107260
PCT Pub. Date: Sep. 23, 2010

(65) Prior Publication Data
US 2011/0274047 A1    Nov. 10, 2011

Related U.S. Application Data

(60) Provisional application No. 61/161,772, filed on Mar. 20, 2009.

(51) Int. Cl.
*H04L 12/28* (2006.01)

(52) U.S. Cl.
USPC ........................................... 370/328

(58) Field of Classification Search
None
See application file for complete search history.

(56) References Cited

U.S. PATENT DOCUMENTS

| 2003/0060165 | A1 | 3/2003 | Horisaki |
| 2006/0209767 | A1 | 9/2006 | Chae et al. |
| 2011/0207487 | A1* | 8/2011 | Yang et al. ............. 455/507 |
| 2012/0002636 | A1* | 1/2012 | Xiao et al. ............. 370/329 |

OTHER PUBLICATIONS

International Search Report for PCT/KR2010/001682.

* cited by examiner

*Primary Examiner* — John Blanton
(74) *Attorney, Agent, or Firm* — Morgan, Lewis & Bockius LLP

(57) ABSTRACT

A method of receiving a signal at a user equipment (UE) from at least two cells in wireless communication system is disclosed. Receiving module may receive data and at least one reference signal from a CoMP (Coordinated Multi-Point) set including at least two cells. Decoding module may decode the received data and the received at least one reference signal. In this case, a power level of the data is same as a power level of the at least one reference signal, or a power ratio between the data and the at least one reference signal is a scaled value. Also, the power level of the data and the at least one reference signal are same for each of the at least two cells. A power ratio between the data and the at least one reference signal is a same scaled value for each of the at least two cells.

8 Claims, 2 Drawing Sheets

METHOD FOR RECEIVING A SIGNAL AT A USER EQUIPMENT (UE) IN A WIRELESS COMMUNICATION SYSTEM

The present application is a national stage of PCT International Application No. PCT/KR2010/001682 filed Mar. 18, 2010, and claims the benefit of U.S. Provisional Application No. 61/161,772 filed Mar. 20, 2009.

TECHNICAL FIELD

The present invention relates to wireless communication, more specially, the present invention relates to method for receiving for a signal at a user equipment (UE) in a wireless communication system.

BACKGROUND ART

CoMP (Coordinated Multi-Point) system may be used to improve the throughput of at cell-boundary users using the improved MIMO (Multiple Input Multiple Output) transmission in multi-cell environment. In case of applying the CoMP system, inter-cell interference may be reduced in multi-cell environment. A UE may also simultaneously receive a data from multi-cell base-station performing CoMP operation.

In addition to, each eNB may improve the performance of the system by supporting one or more UEs using the same radio frequency. Furthermore, an eNB may perform SDMA (Space Division Multiple Access) method based on channel state information between UE and eNB.

CoMP operation scheme includes joint processing (JP) scheme of cooperative MIMO through data sharing and coordinated scheduling scheme/beamforming (CS/CB) scheme.

Serving cell and one or more collaborative cells may be connected to scheduler through the backhaul or x2 interface. Scheduler may receive channel state information which is measured by each eNB through the backhaul. For example, cooperative MIMO operation is scheduled by scheduler for serving eNB and one or more cooperative eNBs. That is, scheduler can directly command for cooperative MIMO operation to each eNB.

As described above, a UE may receive signals from multiple transmission points such as multi-cell operation (e.g. dual cell operation or CoMP Tx/Rx). In this case, there are several consideration points. First of all, multiple cells are required to align timing (Tx timing) alignment so that the corresponding UE receiving signals from multiple cells can easily process and achieve throughput/diversity gain.

Assuming the timing mismatch is less than CP length of received signal, the joint processing scheme in the receiver (e.g., UE, eNB or Relay Node) may be coherent combining or non-coherent combining depending on the used multi-point transmission model(s).

Consider that coherent combining is expected as one of multi-point transmission scheme. Then a signal transmitted from the multi-point need to be coherently combined at the receiver antenna, which can be ensured by phase correction at each transmission point which is obtained by the UE feedback before CoMP transmission.

However, this combined signal may not result in a fully coherent signal even in case of the same number/position of resource elements (REs) transmission and the same MCS (Modulation and Coding Scheme)/MIMO modes. This situation may happen when the ratio between data RE and reference symbol RE do not have the same ratio between the transmission points.

However, a method for the coherent reception at one receiver has not studied yet.

DISCLOSURE

Technical Problem

Accordingly, the present invention is directed to a method of receiving a signal at a user equipment (UE) in wireless communication system that substantially obviates one or more problems due to limitations and disadvantages of the related art.

Technical Solution

To achieve these objects and other advantages and in accordance with the purpose of the invention, as embodied and broadly described herein, a method for receiving a signal at a user equipment (UE) in wireless communication system includes receiving data and at least one reference signal from a CoMP (Coordinated Multi-Point) set including at least two cells; and decoding the received data and the received at least one reference signal, wherein a power level of the data is same as a power level of the at least one reference signal, or a power ratio between the data and the at least one reference signal is a scaled value.

In this case, the power level of the data and the at least one reference signal are same for each of the at least two cells. Also, a power ratio between the data and the at least one reference signal is a same scaled value for each of the at least two cells.

Preferably, the method may further include receiving CoMP set information indicating the CoMP set including the at least two cells.

In another aspect of the present invention, a user equipment (UE) for receiving a signal in wireless communication system includes a receiving module for receiving data and at least one reference signal from a CoMP (Coordinated Multi-Point) set including at least two cells; and decoding module for decoding the received data and the received at least one reference signal, wherein a power level of the data is same as a power level of the at least one reference signal, or a power ratio between the data and the at least one reference signal is a scaled value.

In this case, a power ratio between the data and the at least one reference signal is a same scaled value for each of the at least two cells. Also, a power ratio between the data and the at least one reference signal is a same scaled value for each of the at least two cells.

Preferably, the UE may further includes receiving module for receiving CoMP set information indicating the CoMP set including the at least two cells.

Advantageous Effects

According to various embodiments of the present invention, multiple transmission points may be utilized for CoMP transmission and reception operation.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
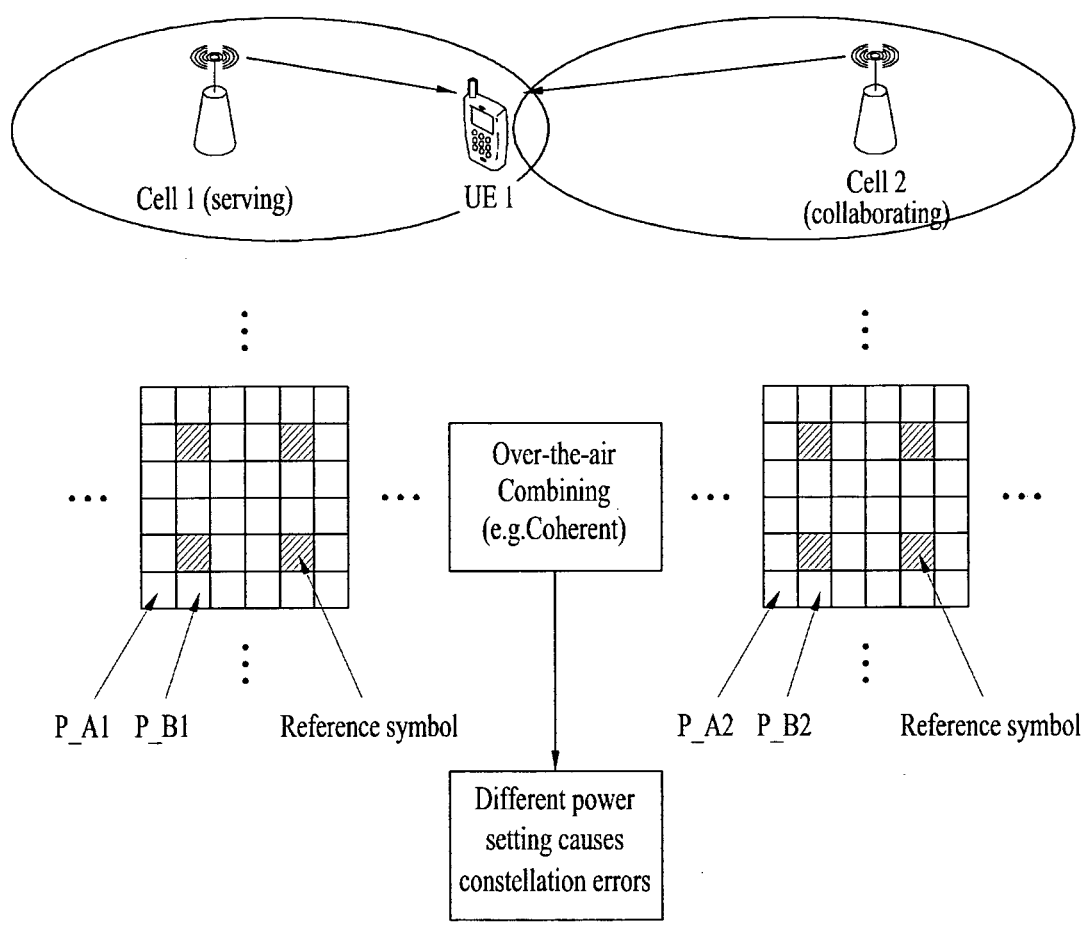
FIG. 1 illustrates an example of multiple transmission point.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as an IEEE 802.16 system, but the present invention is not limited thereto and the remaining parts of the present invention other than unique characteristics of the IEEE 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a user equipment (UE) may include mobile or fixed advanced mobile stations (AMSs), for example, a mobile station (MS) and the like. Also, the base station (BS) may refer to an arbitrary node of a network end which communicates with the above terminal, and may include a Node B (Node-B), an eNode B (eNode-B), and an access point (AP) and the like.

In a mobile communication system, the UE may receive information from the Node B via a downlink, and may transmit information via an uplink. The information that is transmitted and received to and from the UE includes data and a variety of control information. There are a variety of physical channels according to categories of transmission (Tx) and reception (Rx) information of the UE.

The present invention discloses the power allocation and corresponding information sharing method/schemes for inter-cell operation.

A UE may receive signal from multiple cells (e.g., serving cell and collaborative cell). When the coherent combining is considered on the air, a power level and a power ratio between data and reference symbols need to be the same ratio. Even if the received signal at the UE is not combined coherently, the signal transmitted from multiple cells may be constructed to obtain transmit diversity or spatial multiplexing. An antenna precoding may be dependent on the power ratio between data and reference symbols and the total transmission power of data and reference symbols.

A various method of Corresponding information sharing such as power allocation, resource to ease and facilitate the inter-cell cooperation will be described.

As mentioned above, the power ratio between the data and reference symbols may have significant effect on the coherent combining over-the-air or baseband processed LLRs (Log Likelihood Ratios) due to the different ratios. This unbalanced power ratio in multiple transmission point may occur when the number of transmission antenna configuration is different such as in heterogeneous antenna configuration, different DL (downlink) power management among the multiple transmission points (though current LTE specification does not allow this separate power control, additional power control scheme may be used in future), different measurement RS (Reference Symbol) pattern with power boosting, and so on.

Current power allocation or power level is indicated with two parameters such as P_A and P_B, where P_A denotes power level per RE of OFDM symbol without reference symbols and P_B denotes power level per RE of OFDM symbol with reference symbols.

It is noted that the P_A and P_B definition may be cell-specific parameters or can be adjusted parameters ($\rho$_A or $\rho$_B or $\Delta$_offset) such as shown in 3GPP TS36.123. Thus the description on power setting or P_A and P_B may be interpreted as any parameters which may be interpreted as a tool to derive a relationship of modulation symbol power and reference symbol power.

To solve this power ratio mismatch, several approaches may be considered. Power level information sharing at a receiver, modulation order restriction, a CoMP set configuration with consideration on this imbalance, and so on may be considered. Here, the CoMP set may mean set of two or more transmission point performing the CoMP operation.

An eNode B may be called as cell, sector, transmission point, and so on.

The eNode B may determine the downlink transmit energy per resource element (RE). A UE may assume downlink cell-specific RS EPRE (Energy Per Resource Element) is constant across the downlink system bandwidth and constant across all subframes until different cell-specific RS power information is received. The downlink reference-signal EPRE can be derived from the downlink reference-signal transmit power given by the parameter Reference-signal-power provided by higher layers. The downlink reference-signal transmit power is defined as the linear average over the power contributions of all resource elements that carry cell-specific reference signals within the operating system bandwidth.

The ratio of PDSCH (Physical Downlink Shared CHannel) EPRE to cell-specific RS EPRE among PDSCH REs (not applicable to PDSCH REs with zero EPRE) for each OFDM symbol is denoted by either $\rho$_A or $\rho$_B according to the OFDM symbol index as given by table 1. In addition, $\rho$_A and $\rho$_B are UE-specific.

The following table 1 illustrates OFDM symbol indices within a slot where the ratio of the corresponding PDSCH EPRE to the cell-specific RS EPRE is denoted by $\rho_A$ or $\rho_B$.

TABLE 1

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
| --- | --- | --- | --- | --- |
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

The UE may assume that for 16 QAM (Quadrature amplitude modulation), 64 QAM, spatial multiplexing with more than one layer or for PDSCH transmissions associated with the multi-user MIMO transmission scheme, $\rho\_A$ is equal to $\delta_{power-offset}+P_A+10\log_{10}(2)$ [dB] when the UE receives a PDSCH data transmission using precoding for transmit diversity with 4 cell-specific antenna ports.

$\rho\_B$ is equal to $\delta_{power-offset}+P_A$ [dB] otherwise where $\delta_{power-offset}$ is 0 dB for all PDSCH transmission schemes except multi-user MIMO and where is a UE specific parameter provided by higher layers.

If UE-specific RSs are present in a PRB, the ratio of PDSCH EPRE to UE-specific RS EPRE for each OFDM symbol is equal. In addition, the UE may assume that for 16QAM or 64QAM, this ratio is 0 dB.

The cell-specific ratio $\rho_B/\rho_A$ is given by Table 2 according to cell-specific parameter signalled by higher layers and the number of configured eNodeB cell specific antenna ports.

The following table 2 illustrates cell-specific ratio $\rho_B/\rho_A$ for 1, 2, or 4 cell specific antenna ports.

TABLE 2

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

For PMCH with 16QAM or 64QAM, the UE may assume that the ratio of PMCH EPRE to MBSFN RS EPRE is equal to 0 dB.

The determination of reported Relative Narrowband TX Power indication RNTP($n_{PRB}$ is defined as follows:

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases}$$

where $E_A(n_{PRB})$ is the maximum intended EPRE of UE-specific PDSCH REs in OFDM symbols not containing RS in this physical resource block on antenna port p in the considered future time interval; $n_{PRB}$ is the physical resource block number $n_{PRB}=0,\ldots,N_{RB}^{DL}-1$; $RNTP_{threshold}$ takes on one of the following values $RNTP_{threshold} \in \{-\infty, -11, -10, -9, -8, -7, -6, -5, -4, -3, -2, -1, 0, +1, +2, +3\}$ [dB] and $$E_{max\_nom}^{(p)} = \frac{P_{max}^{(p)} \cdot \frac{1}{\Delta f}}{N_{RB}^{DL} \cdot N_{SC}^{RB}}$$

where $P_{max}^{(p)}$ is the base station maximum output power, and $\Delta f$ denotes subcarrier spacing, $N_{RB}^{DL}$ denotes Downlink bandwidth configuration, expressed in unit of $N_{sc}^{RB}$ and $N_{SC}^{RB}$ are resource block size in the frequency domain, expressed as a number of subcarriers.

A method of sharing power level information sharing among transmission points and receiver will be described.

FIG. 1 illustrates an example of multiple transmission point.

Referring to FIG. 1, a UE 1 may receive signal from multiple transmission point (cell 1 and cell 2). The signal transmitted from the multiple point need to be coherently combined at antenna of the UE 1. However, constellation error is caused due to different power setting between cell 1 and cell 2. To solve these problems, power level information need to be shared between multiple transmission point and receiver.

Basic approach of power level information sharing may be based on the explicit power level information sharing (such as P_A, P_B and anything further defined which affects on the symbol demodulation).

Even when the power level information is shared, receiver fails to receive the coherently combined signal from the air. Therefore, this method is suitable for joint processing scheme which does not utilize the over-the-air coherent combinings.

On the other hand, to enable coherent combining over-the-air, the power level information sharing does not help a receiver. For this, it is preferable to set the power level or power ratio between CoMP data and CoMP DRS (or CoMP CRS) to the same value or scaled value for each transmission points. In this case, the CoMP DRS may be UE-specific and the CoMP CRS is affected by the P_A and P_B.

CoMP resource region may mean resource region used for performing CoMP operation by CoMP set. When the power setting is configured for CoMP resource region, the configurable power setting may be restricted compared to the simple unicast case or MBSFN case.

This power setting may be predefined for specific CoMP scheme (e.g., joint processing, coordinated scheduling/Beamforming scheme) in air interface. Alternatively, the power setting information is signaled directly to a UE. Alternatively specific receiver (such as UE) may assume that the power setting of the anchor cell (serving cell) (cell 1) is the same with the other collaborating transmission points (cell 2).

However, this can makes a non-backward compatible aspects on the downlink CoMP transmission schemes. When one cell does not have the same power setting from the others, one of CoMP operation transmission points will be simply to force the power setting of corresponding CoMP resource region to be the same with that of other CoMP operation transmission point.

Instead, the transmission point may choose two options on the power setting of non-CoMP resource region.

A first option is just to set the power setting of the other resource region to be the same with the CoMP resource region. A second option is to keep the original power setting which is different with power setting of CoMP resource region. In the second option case, corresponding transmission point (e.g., serving cell) may broadcast both power setting information of non-CoMP and CoMP resource regions to a receiver. Alternatively, the corresponding transmission point may broadcast power setting information of non-CoMP only to the receiver.

It is noted that the power setting information of the CoMP resource region may not be applied to the non-CoMP REs such as legacy, non-CoMP reference symbols, or physical channels (synchronization, system information, legacy reference symbols, etc) which may exist within the CoMP resource region.

When the power setting information is configured for the CoMP resource region, the configurable power setting may be restricted compared to the simple unicast case or MBSFN (Multicast Broadcast Single Frequency Network) case.

Modulation order restriction may be considered to solve the above mention problems. Simple approach on these problems is to use only the low modulation order such as BPSK (Binary Phase Shift Keying), QPSK (Quadrature Phase Shift Keying), M-PSK (M-ary phase-shift keying), others which are not affected by the scaling problem.

The main issue with different power allocation is due to the scaling problem of received modulated signal which is translated into different constellation points. Therefore, assuming coherent over-the-air combining, it would be preferable to use BPSK or QPSK defined phase-shift-keying style modulation for multiple transmission points.

In this approach, there is no need to restrict or conform for each transmission point to the other transmission points with the same power setting.

Moreover, the transmission points do not need to share the power setting information each other. However, in case of sharing power configuration parameters, the modulation order does not need to be restricted.

A selection or configuration of CoMP set may be considered to solve the above mention problems.

Another way to avoid this cumbersome situation relates to select configuration of CoMP set. Another way is to include that only the transmission points conform each other for the current CoMP transmission scheme.

A UE may measure power level of data and reference symbol transmitted from the multiple transmission points. Then, the UE may transmit measured information including power level or power ratio of data and reference symbol transmitted from the multiple transmission points to the one or more transmission points (e.g., serving cell). Then, the multiple transmission points for CoMP operation may be selected based on the further consideration on the power ratio between data and reference symbol or number of transmission antenna configuration or common (cell or measurement) reference symbol configuration, etc. Therefore, CoMP set may consist of one or more transmission points which have the same power setting.

This approach may perfectly overcome the problem due to data and reference symbol power ratio mismatch.

Alternatively, the mismatched power setting is used artificially.

Considering that the different power ratio provides different channel estimation performance where data symbol LLR may be dependent also on the allocated power level. Since the different channel estimation performance leads to different iterative decoding performance at a receiver, artificially different power setting may be utilized in a way to optimize the multipoint transmission performance.

This approach may be applied to MIMO encoding/decoding scheme with different power setting parameters so that different transmission point(s) may be considered as an antenna port.

More particularly, this approach is preferably applied to case of non-coherent combining over the air.

As described above, multiple transmission points may be utilized for CoMP transmission and reception operation according to various embodiments of the present invention.

Figure 2:
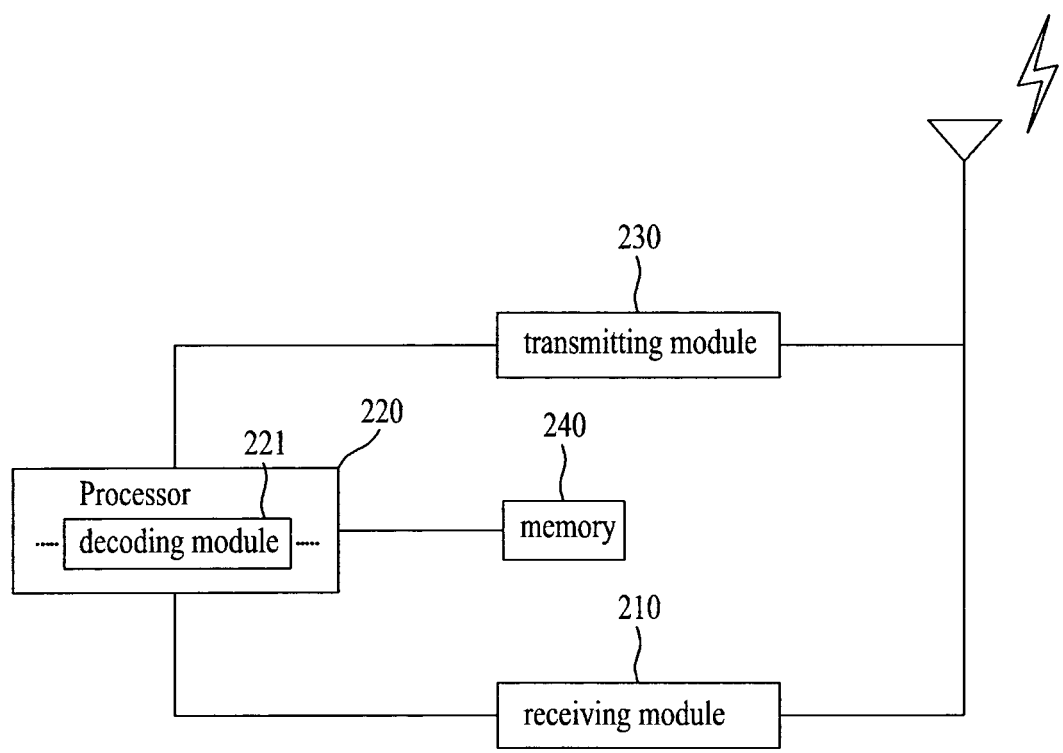
FIG. 2 is a diagram for configuration of a user equipment apparatus according to one preferred embodiment of the present invention.

FIG. 2 is a diagram for configuration of a user equipment apparatus according to one preferred embodiment of the present invention.

Referring to FIG. 2, the UE may include a receiving module 210, processor 220, a transmitting module 230, and memory 240.

The receiving module 210 may receive data and at least one reference signal from CoMP (Coordinated Multi-Point) set including at least two cells.

Processor 220 may include a decoding module 221. decoding module 221 may decode the received data and at least one reference signal. In this case, a power level of the data is same as a power level of the at least reference signal, or a power ratio between the data and the at least one reference signal is scaled value. Also, the power level of the data and the at least one reference signal are same for each of the at least two cells, and a power ratio between the data and the at least one reference signal is a same scaled value for each of the at least two cells.

The transmitting module 230 may transmit signal to one or more transmission points.

The memory 240 may information calculated in the processor 220 for a predetermined period of time, and may be replaced with a buffer (not shown) or the like.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

A method for receiving a signal at a user equipment in wireless communication system is applicable to IEEE 802.16m, 3GPP LTE system, and like that.

The invention claimed is:

1. A method for receiving a signal at a user equipment (UE) in a wireless communication system, the method comprising:

receiving CoMP (Coordinated Multi-Point) set information that indicates a CoMP set which includes at least two cells, wherein the at least two cells included in the CoMP set have a same power setting configuration;

receiving data and at least one reference signal from the at least two cells included in the CoMP set, wherein the data received from each of the at least two cells is the same; and decoding the received data and the received at least one reference signal, wherein power levels of the data and the at least one reference signal are the same for each of the at least two values, or a power ratio between the data and the at least one reference signal is a scaled value for each of the at least two cells.

2. The method of claim 1, wherein at least one of the steps of receiving data and at least one reference signal and decoding the received data employs a joint processing (JP) scheme.

3. The method of claim 1, wherein the data and the at least one reference signal are received via a CoMP resource region used for CoMP (Coordinated Multi-Point) transmission and reception.

4. The method of claim 3, wherein the CoMP resource region and a non-CoMP resource region have a same power setting.

5. A user equipment (UE) for receiving a signal in wireless communication system, the UE comprising:

a receiving module for receiving CoMP (Coordinated Multi-Point) set information that indicates a CoMP set which includes at least two cells and for receiving data and at least one reference signal from the at least two cells included in the CoMP set; and a decoding module for decoding the received data and the received at least one reference signal, wherein the at least two cells included in the CoMP set have a same power setting configuration, wherein the data received from each of the at least two cells is the same, and wherein power levels of the data and the at least one reference signal are the same for each of the at least two values, or a power ratio between the data and the at least one reference signal is a scaled value for each of the at least two cells.

6. The UE of claim 5, wherein at least one of the steps of receiving data and at least one reference signal and decoding the received data employs a joint processing (JP) scheme.

7. The UE of claim 5, wherein the data and the at least one reference signal are received via a CoMP resource region used for CoMP (Coordinated Multi-Point) transmission and reception.

8. The UE of claim 7, wherein the CoMP resource region and a non-CoMP resource region have a same power setting.

* * * * *